(12) United States Patent
Lu et al.

(10) Patent No.: US 11,562,344 B2
(45) Date of Patent: Jan. 24, 2023

(54) DATA PROCESSING METHOD BASED ON NFC LABEL, SYSTEM AND SERVER THEREOF

(71) Applicant: CHINA UNIONPAY CO., LTD., Shanghai (CN)

(72) Inventors: Zhijun Lu, Shanghai (CN); Haijian Jiang, Shanghai (CN); Gang Liu, Shanghai (CN); Jinren Lin, Shanghai (CN); Hua Cai, Shanghai (CN); Zheng Zhang, Shanghai (CN); Kewei Jin, Shanghai (CN); Qin Xia, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/040,203

(22) PCT Filed: Mar. 18, 2019

(86) PCT No.: PCT/CN2019/078428
§ 371 (c)(1),
(2) Date: Sep. 22, 2020

(87) PCT Pub. No.: WO2019/179382
PCT Pub. Date: Sep. 26, 2019

(65) Prior Publication Data
US 2021/0012320 A1    Jan. 14, 2021

(30) Foreign Application Priority Data

Mar. 22, 2018   (CN) .......................... 201810239239.2

(51) Int. Cl.
*G06Q 20/32*     (2012.01)
*G06Q 20/40*     (2012.01)

(52) U.S. Cl.
CPC ..... *G06Q 20/3278* (2013.01); *G06Q 20/4014* (2013.01); *G06Q 20/4093* (2013.01)

(58) Field of Classification Search
CPC ............ G06Q 20/3278; G06Q 20/352; G06Q 30/0601; H04L 67/02
See application file for complete search history.

(56) References Cited

U.S. PATENT DOCUMENTS 9,082,143 B1 *   7/2015   Cleary ............... G06Q 30/0601
9,680,688 B2     6/2017   Zhang et al.
(Continued)

FOREIGN PATENT DOCUMENTS

CN    102982446 A    3/2013
CN    103914770 A    7/2014
(Continued)

OTHER PUBLICATIONS

Secure data transmission between an NFC tag and an NFC enabled smartphone (Year: 2015).*
(Continued)

*Primary Examiner* — Calvin L Hewitt, II
*Assistant Examiner* — Amanulla Abdullaev
(74) *Attorney, Agent, or Firm* — Marshall, Gerstein & Borun LLP (57) ABSTRACT

The invention relates to a data processing method based on NFC tag. The method comprises: reading the NFC tag, the NFC tag comprising tag content and tag ID; generating an NFC tag payment request based on the tag content and tag ID; parsing the NFC tag payment request and obtaining an parsing reply to the NFC tag payment request; generating an order generation request based on the parsing reply, wherein the order generation request is for causing an order to be generated based on first account information, current transaction information and second account information; gener- (Continued)

ating the order based on the order generation request; and payment step for performing payment based on the order. According to embodiments of the invention, the payment process can be simplified, also, there is no need to set the NFC-specific reading device in the embodiments of the invention, and the cost of merchants can be reduced.

6 Claims, 5 Drawing Sheets

(56) References Cited

U.S. PATENT DOCUMENTS

| | | | |
|---|---|---|---|
| 10,832,020 B2 | 11/2020 | Tobita et al. | |
| 2013/0126610 A1* | 5/2013 | Aihara | G06Q 20/322 235/383 |
| 2014/0027506 A1* | 1/2014 | Heo | G06Q 20/3278 235/492 |
| 2014/0040120 A1* | 2/2014 | Cho | G06Q 20/3278 705/39 |
| 2014/0181256 A1* | 6/2014 | Trifa | H04L 67/54 709/218 |
| 2015/0193765 A1* | 7/2015 | Gadotti | G06Q 20/3278 705/39 |
| 2015/0287021 A1* | 10/2015 | Itwaru | G06Q 20/40 705/44 |
| 2016/0217454 A1 | 7/2016 | Killoran, Jr. | |
| 2016/0292667 A9* | 10/2016 | Laracey | G06Q 20/3821 |
| 2019/0141021 A1* | 5/2019 | Isaacson | G06Q 50/01 |

FOREIGN PATENT DOCUMENTS

| | | |
|---|---|---|
| CN | 105046486 A | 11/2015 |
| CN | 105279645 A | 1/2016 |
| CN | 106096950 A | 11/2016 |
| CN | 107203877 A | 9/2017 |
| CN | 107545425 A | 1/2018 |
| CN | 107609865 A | 1/2018 |
| JP | 2014063533 A | 4/2014 |
| JP | 2015520980 A | 7/2015 |
| JP | 2018025844 A | 2/2018 |
| WO | WO-2014/021053 A1 | 2/2014 |
| WO | WO-2015/027372 A1 | 3/2015 |

OTHER PUBLICATIONS

How does NFC payment work? (Year: 2017).*
International Application No. PCT/CN2019/078428, International Search Report, dated Jun. 18, 2019.
Japanese Patent Application No. 2020-550736, Notice of Reasons for Refusal, dated Nov. 29, 2021.
European Patent Application No. 19772134, Supplementary European Search Report, dated Nov. 18, 2021.

* cited by examiner

DATA PROCESSING METHOD BASED ON NFC LABEL, SYSTEM AND SERVER THEREOF

CROSS REFERENCE TO RELATED APPLICATIONS

This application is the U.S. national phase of PCT Application No. PCT/CN2019/078428, filed on Mar. 18, 2019, which claims priority to Chinese Application No. 201810239239.2, filed Mar. 22, 2018, the entire disclosures of which are hereby incorporated by reference in their entirety.

TECHNICAL FIELD

The embodiments of the invention relate to computer technology, and in particular, to a data processing method, a data processing system and a server based on NFC tag.

BACKGROUND

In the current mobile payment, the mode of two-dimensional code payment has been widely applied, nevertheless in the payment process, the mode of two-dimensional code payment still has the problems that the steps are relatively complex, the payment time is long, and the payment efficiency is low. Taking a general two-dimensional code payment process as an example, the specific steps of code scanning payment are the following 8 steps: unlocking a screen, opening related APP, clicking on "Discovery", clicking on "Scan", scanning the code, entering a payment amount, clicking to pay, and verifying identity information.

The information disclosed in the background section of the invention is intended merely to provide understanding of the general background of the invention and should not be taken as an admission or suggestion in any form that such information constitutes prior art known to those of ordinary skill in the art.

SUMMARY

In view of the above, it is intended to provide for the above problems a data processing method, data processing system, as well as a server based on NFC tag, which reduce the payment steps and improve payment efficiency.

The data processing method based on NFC tag according to embodiments of the invention comprises:

tag reading step: reading the NFC tag, wherein the NFC tag comprises tag content and a tag ID;

payment request generation step: generating an NFC tag payment request based on the tag content and the tag ID;

payment request parsing step: parsing the NFC tag payment request and obtaining a parsing reply to the NFC tag payment request, wherein the parsing reply comprises first account information obtained by parsing the NFC tag;

order generation requesting step: generating an order generation request based on the parsing reply, wherein the order generation request is for causing an order to be generated based on the first account information and current transaction information;

order generation step: generating the order based on the order generation request; and payment step: calling second account information, and performing payment based on the order.

The data processing method based on NFC tag according to embodiments of the invention comprises:

tag reading step: reading the NFC tag, wherein the NFC tag comprises tag content and a tag ID;

payment request generation step: generating and sending an NFC tag payment request based on the tag content and the tag ID, wherein the NFC tag payment request is for obtaining a pre-linked first account information in the tag content by being parsed;

order generation requesting step: receiving the first account information obtained by parsing the NFC tag payment request and generating and sending an order generation request in combination with current transaction information, wherein the order generation request is for causing an order to be generated based on the first account information and the current transaction information; and payment step: receiving the generated order, calling second account information, and performing payment based on the order.

The data processing method based on NFC tag according to embodiments of the invention comprises:

first receiving step: receiving an NFC tag payment request, wherein the NFC tag payment request comprises tag content and a tag ID;

parsing requesting step, generating and sending a parsing request used for parsing the NFC tag payment request based on the NFC tag payment request, wherein the parsing request is for obtaining first account information by parsing the NFC tag payment request;

second receiving step: receiving the first account information obtained by parsing the parsing request; and order generation step: generating an order based on the received order generation request, wherein the order generation request is for generating the order based on the tag content, the tag ID, the first account information and current transaction information.

A data processing system for data processing based on NFC tag according to embodiments of the invention, the data processing system being implemented on a computer, comprises:

a tag reading module for reading an NFC tag, wherein the NFC tag comprises tag content and a tag ID;

a payment request generation module for generating and sending an NFC tag payment request based on the tag content and the tag ID, wherein the NFC tag payment request is for obtaining first account information by being parsed;

an order generation request module for receiving the first account information obtained by parsing the NFC tag payment request and generating an order generation request in combination with current transaction information, wherein the order generation request is for causing an order to be generated based on the first account information and current transaction information; and a payment module for receiving the generated order, calling second account information, and performing payment based on the order.

A server according to embodiments of the invention comprises:

a first receiving module for receiving an NFC tag payment request, wherein the NFC tag payment request comprises tag content and a tag ID;

a parsing request module for generating and sending a parsing request for parsing the NFC tag payment request based on the tag ID, wherein the parsing request is for obtaining first account information by parsing the NFC tag payment request;

a second receiving module for receiving a reply to the parsed request; and an order generation module for generating an order based on the received order generation request, wherein the order generation request is for requesting generation of the order based on the tag content, the tag ID, the first account information and present transaction information.

A computer readable medium according to embodiments of the invention having stored thereon a computer program, wherein the computer program, when executed by a processor, implements the data processing method described above.

A computer device, comprising a memory, a processor, and a computer program stored on the memory and executable on the processor, wherein the processor, when executing the computer program, implements the data processing method described above.

With the NFC payment implemented by the data processing method and the data processing system based on NFC tag of the embodiments, compared with the two-dimensional code payment, the payment steps performed by a user can be reduced, the time cost of the payment is reduced, and the payment efficiency is improved.

Moreover, in the NFC payment implemented in accordance with the data processing method and the data processing system based on NFC tag of the embodiments, rather than NFC tag payment for a fixed amount in the prior art, there being NFC tag payment for variable amounts of the merchant, which makes the mode of payment more flexible.

Further, in the data processing method and the data processing system based on NFC tag of the embodiments, after the NFC tag is read, rather than visiting a website in the tag, the content of the tag read directly and displayed according to a preset H5 page, expediting the speed of content reading through the tag.

In the NFC payment implemented in accordance with the data processing method and the data processing system based on NFC tag of the embodiments, compared with the tag payment in Ali unmanned supermarket (the tag payment in the scheme of the Ali unmanned supermarket is passive tag reading at a fixed location, which is high in realization cost and inconvenient), the embodiments provide an active tag reading for users, no additional active reading device is required by the merchant, and the payment can be completed at any place. Therefore, for the merchant, with the data processing method and the data processing system based on NFC tag of the embodiments, only the NFC tags and not the active reading device need to be set. Thereby, it can save cost and is easy to popularize and apply among small merchants.

Other features and advantages of the methods and apparatus of the embodiments will more specifically become apparent or be illuminated by the accompanying drawings and the subsequent specific embodiments for illustrating certain principles of the invention in conjunction with the accompanying drawings incorporated herein.

DETAILED DESCRIPTION OF THE EMBODIMENT(S)

Introduced in the following are some of the various embodiments of the invention and is intended to provide a basic understanding of the invention. It is not intended to identify key or critical elements of the invention or to define the scope to be protected.

Before illustrating the data processing method based on the NFC tag of the embodiments of the present invention, the NFC tag fabrication process applied in the embodiments of the present invention will first be illustrated.

In order to fabricate the NFC tag, the tag ID of the merchant is firstly read by the mobile device and then sent to the merchant service platform, the merchant service platform retrieves the registered merchant information according to the ID, and returns the merchant information to the mobile device, the information is written by the mobile device into the tag at the merchant side.

Figure 1:
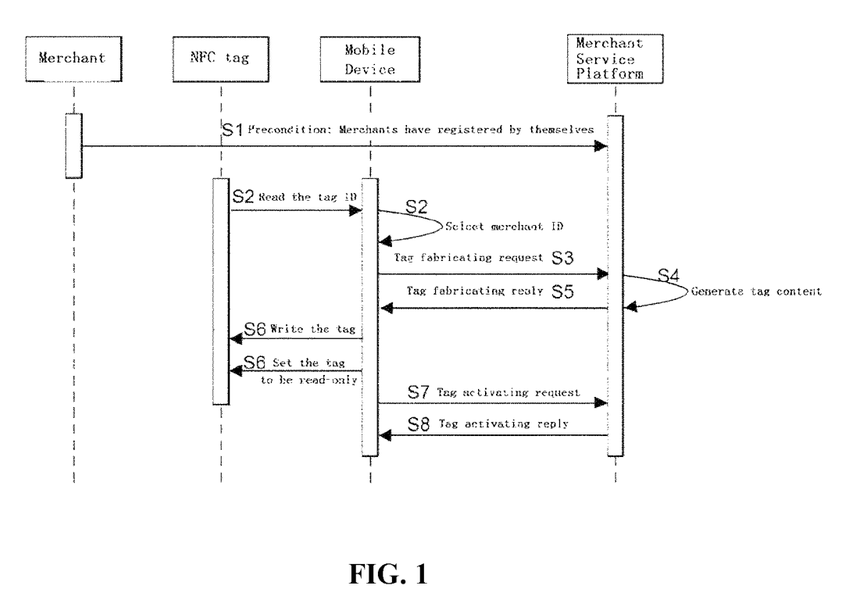
FIG. 1 is a flow chart illustrating fabrication of an NFC tag.

FIG. 1 is a flow chart illustrating the fabrication of an NFC tag.

As shown in FIG. 1, at step S1, the merchant registers with the merchant service platform, reserves the merchant information (merchant name, merchant city, country code, etc.), and the merchant service platform generates a unique merchant ID, assigns a merchant MCC, merchant number.

In step S2, a blank NFC tag ID is read by the mobile device and the merchant ID of the merchant is selected; in step S3, the merchant ID and the tag ID are sent to the merchant service platform, and then a tag fabricating request is initiated.

In step S4, the merchant service platform retrieves the merchant ID, finds the corresponding merchant information, and generates tag content from the merchant information along with the merchant MCC and the merchant number.

In step S5, the merchant service platform returns the fabricated tag content to the mobile device.

In step S6, the tag content received by the mobile device is written into the blank tag and an expiration date of the tag is set, the tag is set to be read-only, and the tag fabricating state is updated to be successful.

In step S7, the tag fabricating state and the tag expiration date are sent to the merchant service platform through the mobile device.

In step S8, after the merchant service platform receives the information, it returns reply information which the tag can be used for the transaction to the mobile device.

Next, a payment processing performed based on the NFC tag fabricated above is illustrated. In the following description, the mobile phone PAY wallet reading the NFC tag is taken as an example, but of course other data processing systems capable of performing data processing on the NFC tag may be used apart from the mobile phone PAY wallet.

The payment process based on the NFC tag is mainly as follows:

the mobile phone PAY wallet touches the NFC tag, reads the tag ID, sends an NFC tag payment request to the NFC tag payment platform; the NFC tag payment platform sends an NFC tag parsing request to the merchant service platform after receiving the NFC tag payment request; the merchant service platform parses the tag and returns the analysis information to the NFC tag payment platform; the information again returns to the mobile phone PAY wallet, the mobile phone PAY wallet generates an order generation request based on the returned information and sends the request to the NFC tag payment platform, the NFC tag payment platform returns the generated order generation reply, and the mobile phone PAY wallet completes the payment.

Next, the specific process for payment is illustrated.

Figure 2:
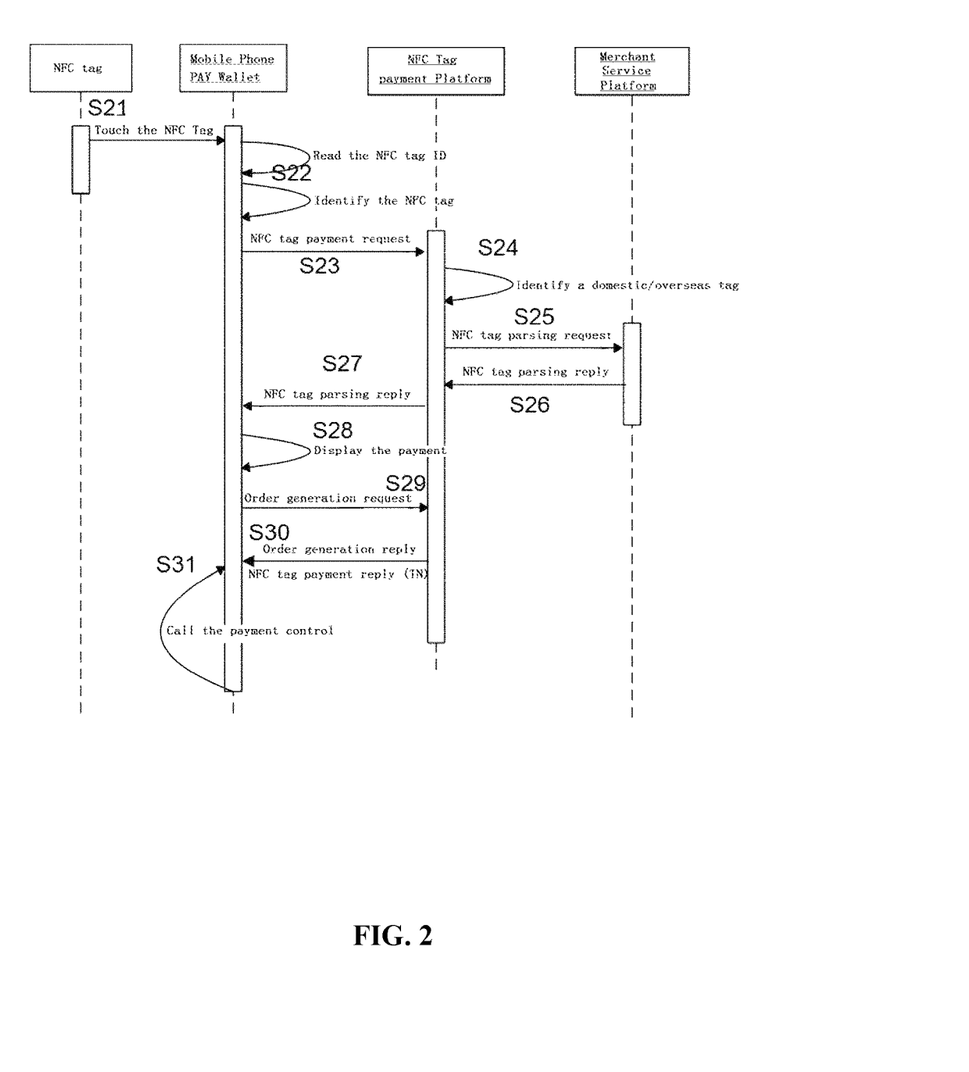
FIG. 2 is a flow chart illustrating data processing based on an NFC tag according to an embodiment of the present invention.

FIG. 2 is a flow chart illustrating data processing based on an NFC tag according to an embodiment of the present invention.

As shown in FIG. 2, in step S21, the mobile phone PAY wallet touches the NFC tag.

In step S22, the mobile phone PAY wallet reads the NFC tag content and the tag ID and is able to identify the issuing authority of the NFC tag based on the tag content (specifically, for example, in the process of fabricating a tag, a column of "Merchant Account Information" field may be set in the tag content, and the issuing authority may be identified based on the "Merchant Account Information" in the tag content).

Here, since in the NFC tag, tag content such as merchant information has been saved, the mobile phone PAY can directly read the content in the tag directly and display the content directly in the mobile phone PAY according to a preset display format, and the process may not require networking; or the mobile phone PAY reads the content and parameters in the tag, and composes a webpage link according to a preset format, and calls the content in the NFC tag payment platform.

In step S23, under the condition that the mobile phone PAY supports the issuing authority, the mobile phone PAY organizes the network link, calls a tag payment H5 page (H5: HTML5, Hyper Text Markup Language 5), and sends the NFC tag payment request information, wherein the NFC tag payment request information comprises the NFC tag content and the tag ID.

Here, there exist two cases for the display of the H5 page:
(1) Under the condition of an environment with a better network, after the tag content is read by the mobile phone, forming a webpage link according to a certain format, accessing the NFC tag payment platform, pushing the H5 page and the merchant data saved at the backend by the platform, and displaying the content on the H5 page;
(2) Under the condition of an environment with a poor network, the H5 page is generated directly by the mobile phone and the content is read from the tag and displayed on the H5 page.

In step S24, the NFC tag payment platform identifies whether a tag is domestic or overseas after it receives the tag payment request, and can turn the domestic and overseas tags to different NFC tag payment platforms for processing, or the tags may be processed by the same NFC tag payment platform.

In step S25, the NFC tag payment platform again sends an NFC tag parsing request to the merchant service platform, the request comprising the tag content and the tag ID.

In step S26, after the merchant service platform receives the NFC tag parsing request, it parses the NFC tag content, verifies the validity of the tag, judges whether the parsed merchant information is consistent with the merchant information saved at the backend or not, and an NFC tag parsing reply is returned to the NFC tag payment platform when verified to be consistent. The NFC tag parsing reply comprises the parsed tag content, whether the tag ID is consistent and the merchants' receipt account.

In step S27, the NFC tag payment platform receives the NFC tag parsing reply and returns the reply to the mobile phone PAY wallet.

In step S28, the mobile phone PAY wallet displays a payment interface according to the NFC tag parsing reply, and the user enters the payment amount. In particular, under the condition that it is a merchant with fixed amount, the user does not need to enter an amount.

In step S29, the mobile phone PAY wallet sends an order generation request to the NFC tag payment platform, the order generation request comprising the tag content, the tag ID, the receipt account information (corresponding to "the first account information" in the claims), and the payment amount (corresponding to "the current transaction information" in the claims).

In step S30, the NFC tag payment platform generates an order according to the order generation request, returns the order generation reply (TN: transaction number) and an NFC tag payment reply (TN) to the mobile phone PAY wallet.

In step S30, after the mobile phone PAY wallet receives the order generation reply (TN) and the NFC tag payment reply (TN), it calls the payment control according to the TN, calls the payment account information (corresponding to "the second account information" in the claims) through the payment control, and completes the payment based on the above order.

Next, a specific flow of performing data processing based on the NFC tag is described for yet another embodiment of the present invention.

Figure 3:
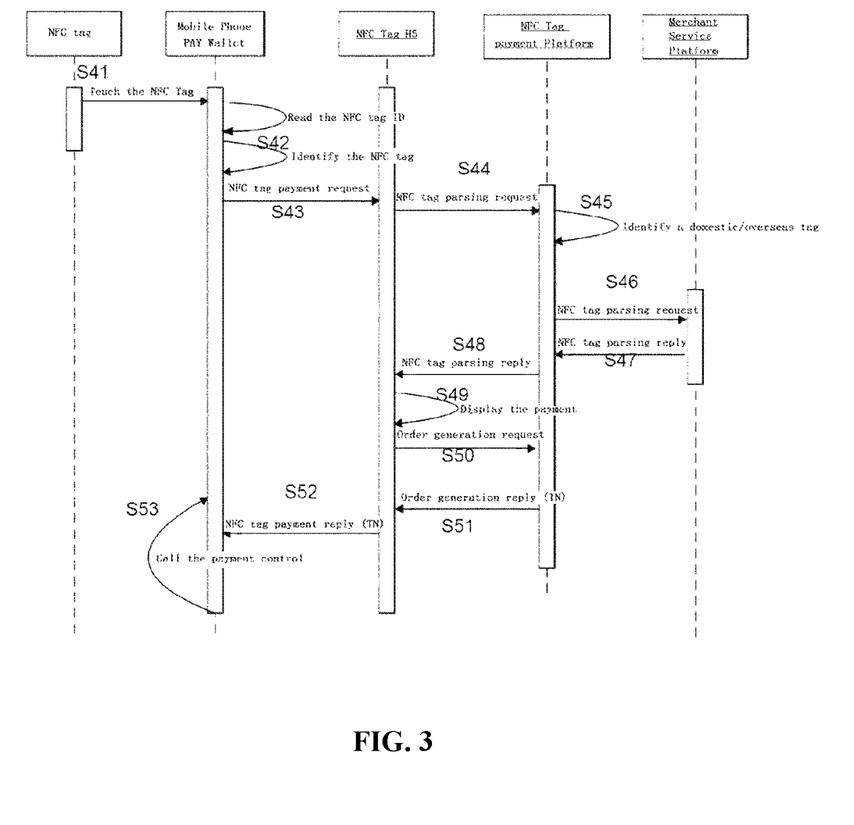
FIG. 3 is a flow chart illustrating data processing based on an NFC tag according to yet another embodiment of the present invention.

FIG. 3 is a flow chart illustrating data processing based on an NFC tag according to yet another embodiment of the present invention.

In this embodiment, in order to facilitate understanding of the data processing flow, the NFC tag H5 is individually represented as a single body.

As shown in FIG. 3, in step S41, the mobile phone PAY wallet touches the NFC tag. In step S42, the NFC tag content and the tag ID are read and the issuing authority of the NFC tag is identified.

In step S42, since tag content such as merchant information has already been saved in the tag, the mobile phone PAY wallet can directly read the content in the tag and display the content directly in the mobile phone PAY according to a preset display format, and the process may not require networking; or the mobile phone PAY reads the content and parameters in the tag, and composes a webpage link according to a preset format, and calls the content in the NFC tag payment platform.

In step S43, under the condition that the mobile phone PAY supports the issuing authority, the mobile phone PAY organizes the network link, calls a tag payment H5, and sends the NFC tag payment request information, wherein the NFC tag payment request information comprises the NFC tag content and the tag ID.

In step S44, after the tag payment H5 receives the request, an NFC tag parsing request is sent to the NFC tag payment platform, the request comprising the tag content and the tag ID.

In step S45, the NFC tag payment platform identifies whether a tag is domestic or overseas after it receives the request, and can turn the domestic and overseas tags to different NFC tag payment platforms for processing, or the tags may be processed by the same NFC tag payment platform.

In step S46, the NFC tag payment platform again sends an NFC tag parsing request to the merchant service platform.

In step S47, the merchant service platform parses the NFC tag data, and verifies the validity of the tag, wherein the verification of validity comprises: judging whether the parsed merchant information is consistent with the merchant information saved at the backend or not. When the tag is verified to be valid, an NFC tag parsing reply is returned to the NFC tag payment platform, wherein the NFC tag parsing reply comprises the parsed tag content, the tag ID and the merchants' receipt account.

In step S48, the NFC tag payment platform returns an NFC tag parsing reply to the tag payment H5.

In step S49, the tag payment H5 displays a payment interface according to the parsing reply, and the payment amount is entered. In particular, the user does not need to enter an amount under the condition that it is a merchant with fixed amount.

In step S50, the tag payment H5 sends an order generation request to the NFC tag payment platform, wherein the order generation request contains the tag content, the tag ID, the receipt account information (corresponding to "the first account information" in the claims), and the payment amount (corresponding to "the current transaction information" in the claims).

In step S51, the NFC tag payment platform generates an order and returns an order generation reply (TN) to the NFC tag H5.

In step S52, the tag payment H5 receives the order generation reply (TN) and returns the NFC tag payment reply (TN) to the mobile phone PAY wallet.

In step S53, the mobile phone PAY wallet calls the payment control according to the TN, calls the payment account information (corresponding to "the second account information" in the claims) with the payment control and completes the payment based on above the order.

The data processing method for data processing based on the NFC tag of the embodiments of the present invention is illustrated above. Next, a data processing system for data processing based on the NFC tag of the embodiments of the present invention is illustrated.

Figure 4:
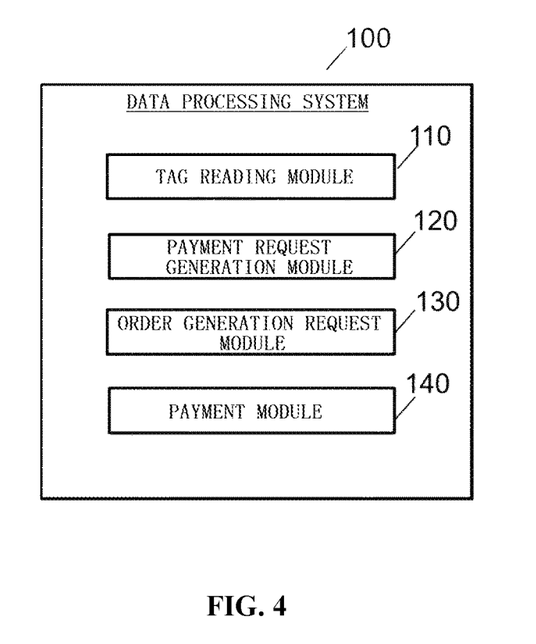
FIG. 4 is a block diagram illustrating a data processing system based on an NFC tag according to an embodiment of the present invention.

FIG. 4 is a block diagram illustrating a data processing system based on an NFC tag according to an embodiment of the present invention.

As shown in FIG. 4, a data processing system 100 based on an NFC tag of an embodiment of the invention comprises:

a tag reading module 110 for reading an NFC tag, wherein the NFC tag contains tag content and a tag ID;

a payment request generation module 120 for generating and sending an NFC tag payment request based on the tag content and the tag ID, wherein the NFC tag payment request is for obtaining first account information by being parsed;

an order generation request module 130 for receiving the first account information obtained by parsing the NFC tag payment request and generating an order generation request in combination with current transaction information, wherein the order generation request is for causing an order to be generated based on the first account information and the current transaction information; and a payment module 140 for receiving the generated order, calling second account information, and performing payment based on the order.

Wherein the tag reading module 110 reads the tag content and the tag ID in the NFC tag and composes a webpage link according to a preset format.

The payment request generation module 120 calls a tag payment HTML5 using the webpage link, and sends the NFC tag payment request to the issuing authority issuing the NFC tag based on the tag ID.

The order generation request module 130 obtains a current transaction amount or a preset fixed transaction amount as the current transaction information.

The data processing system 100 based on NFC tag according to an embodiment of the present invention is implemented on a computer, which, as one example, corresponds to the cell phone PAY wallet in the above embodiments, and of course, it may have a wide variety of variations, such as a wearable device or the like.

Next, the server involved in data processing based on the NFC tag of an embodiment of the present invention is illustrated.

Figure 5:
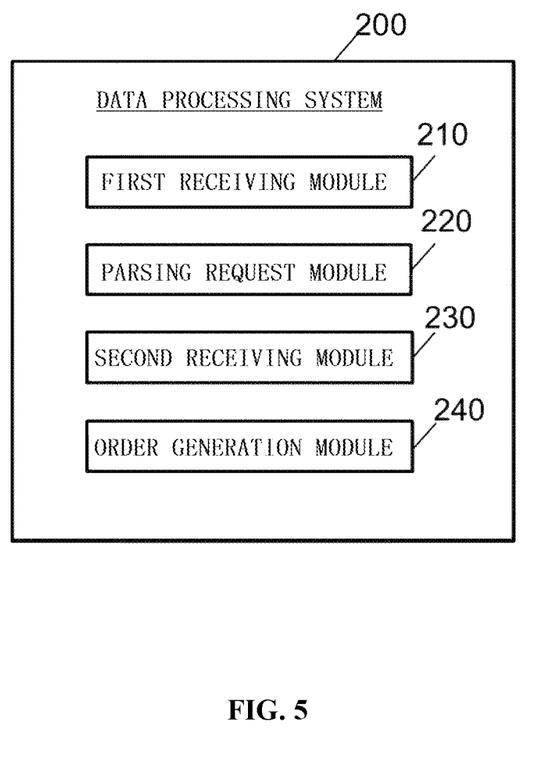
FIG. 5 is a block diagram illustrating a server according to an embodiment of the present invention.

FIG. 5 is a block diagram illustrating a server according to an embodiment of the present invention.

As shown in FIG. 5, the server 200 of an embodiment of the present invention comprises:

a first receiving module 210 for receiving an NFC tag payment request, wherein the NFC tag payment request comprises tag content and a tag ID;

a parsing request module 220 for generating and sending a parsing request for parsing the NFC tag payment request based on the tag ID, wherein the parsing request is for causing the NFC tag payment request to be parsed to obtain first account information;

a second receiving module 230 for receiving a reply to the parsed request;

an order generation module 240 for generating an order based on the received order generation request, wherein the order generation request is for requesting generation of the order based on the tag content, the tag ID, the first account information and the present transaction information.

Furthermore, the embodiments of the present invention also provide a computer readable medium having stored thereon a computer program, wherein, when executed by a processor, the computer program implements the data processing method described above.

Further, the embodiments of the present invention also provides a computer device comprising a memory, a processor, and a computer program stored on the memory and executable on the processor, wherein the processor, when executing the computer program, implements the data processing method described above.

As described above, with the NFC payment implemented by the data processing method and the data processing system based on the NFC tag of the embodiments, compared with the two-dimensional code payment, the payment steps performed by a user can be reduced, the time cost of the payment is reduced, and the payment efficiency is improved.

Moreover, in the NFC payment implemented in accordance with the data processing method and the data processing system based on NFC tag of the embodiments, rather than NFC tag payment for a fixed amount in the prior art, there being NFC tag payment for variable amounts of the merchant, which makes the mode of payment more flexible.

Further, in the data processing method and the data processing system based on NFC tag of the embodiments, after the NFC tag is read, rather than visiting a website in the tag, the tag content is read directly and displayed according to a preset H5 page, expediting the speed of content reading through the tag.

Further, in the NFC payment implemented in accordance with the data processing method and the data processing system based on NFC tag of the embodiments, compared with the tag payment in Ali unmanned supermarket (the tag payment in the scheme of the Ali unmanned supermarket is passive tag reading at a fixed location, which is high in realization cost and inconvenient), the embodiments provide an active tag reading for users, no additional active reading device is required by the merchant, and the payment can be completed at any place. Therefore, for the merchant, with the data processing method and the data processing system based on NFC tag of the embodiments, only the NFC tags and not the active reading device need to be set. Thereby, it can save cost and is easy to popularize and apply among small merchants.

The above examples mainly illustrate the data processing method, the data processing system and a server based on the NFC tag of the embodiments. While only some embodiments of the present invention have been described, it should be understood by those of ordinary skill in the art that the embodiments may be embodied in many other forms without departing from its spirit and scope. Accordingly, the illustrated examples and embodiments are to be considered as illustrative and not restrictive, and the embodiments of the invention may encompass various modifications and substitutions without departing from the spirit and scope of the invention as defined by the appended claims.

What is claimed is:

1. A data processing method, comprising:
    storing, by a merchant service platform, merchant information;
    reading, by a mobile phone of a user, NFC tag content and a Tag ID from an NFC tag;
    transmitting, by the mobile phone via a webpage, the NFC tag content and the Tag ID to a payment platform;
    transmitting, by the payment platform, the NFC tag content and the Tag ID to a merchant service platform;
    parsing, by the merchant service platform, the NFC tag content;
    verifying, by the merchant service platform, the parsed NFC tag content by comparing the parsed NFC tag content to the merchant information;
    transmitting, by the merchant service platform, the verified parsed NFC tag content, the Tag ID, and a receipt account information of a merchant to the payment platform;
    generating, by the payment platform, an order based on the NFC tag content, the Tag ID, the receipt account information, and a payment amount;
    transmitting, by the payment platform, the order to the mobile phone via the webpage;
    generating, by the mobile phone, a payment for the order using payment account information of the user.

2. The data processing method of claim 1, wherein transmitting the NFC tag content and the Tag ID to the payment platform includes:
    accessing, by the mobile phone, the webpage based on the NFC tag content; and
    transmitting, by the mobile phone, the NFC tag content and the Tag ID to the webpage.

3. The data processing method of claim 1, further comprising:
    determining, by the payment platform, whether the NFC tag is domestic or foreign.

4. The data processing method of claim 1, further comprising:
    transmitting, by the payment platform, the verified parsed NFC tag content, the Tag ID, and the receipt account information to the webpage;
    receiving, by the mobile phone, a payment interface comprising the verified parsed NFC tag content, the Tag ID, and the receipt account information from the webpage; and
    transmitting, by the mobile phone, an order generation request including the payment amount to the payment platform.

5. The data processing method of claim 4, further comprising:
    entering, by the mobile phone, the payment amount into the payment interface.

6. The data processing method of claim 4, wherein the payment amount is a fixed amount.

* * * * *